J. A. BRADSHAW.
STRAINER FOR GASOLENE TANKS.
APPLICATION FILED AUG. 6, 1917.

1,253,927.

Patented Jan. 15, 1918.

Witness
Will Freeman

Inventor
John A. Bradshaw
By Osuig & Bass
Attys.

UNITED STATES PATENT OFFICE.

JOHN A. BRADSHAW, OF PATON, IOWA.

STRAINER FOR GASOLENE-TANKS.

1,253,927.

Specification of Letters Patent.  Patented Jan. 15, 1918.

Application filed August 6, 1917. Serial No. 184,631.

*To all whom it may concern:*

Be it known that I, JOHN A. BRADSHAW, a citizen of the United States, and resident of Paton, in the county of Greene and State of Iowa, have invented a certain new and useful Strainer for Gasolene-Tanks, of which the following is a specification.

My invention relates to strainers for gasolene tanks.

The object of my invention is to provide a strainer adapted to be mounted in the upper portion of a gasolene tank, and through which gasolene may be poured for filling the tank, so constructed as to effect an efficient straining of the gasolene poured through the device.

One of the special objects of my invention is to provide such a device which strains the gasolene during an upward movement thereof, for insuring a more perfect straining of any water that may be in the gasolene.

Still a further object is to provide such a strainer which can be mounted in the ordinary opening provided in a gasolene tank, and extended through said opening into the interior of the tank with a minimum of modification of the ordinary parts of the tank.

Still a further object of my invention is to provide such a strainer so constructed and arranged that the larger part thereof may be made in a standard form and size, while a comparatively small part thereof can be made special for fitting tanks of different sizes and makes.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1:
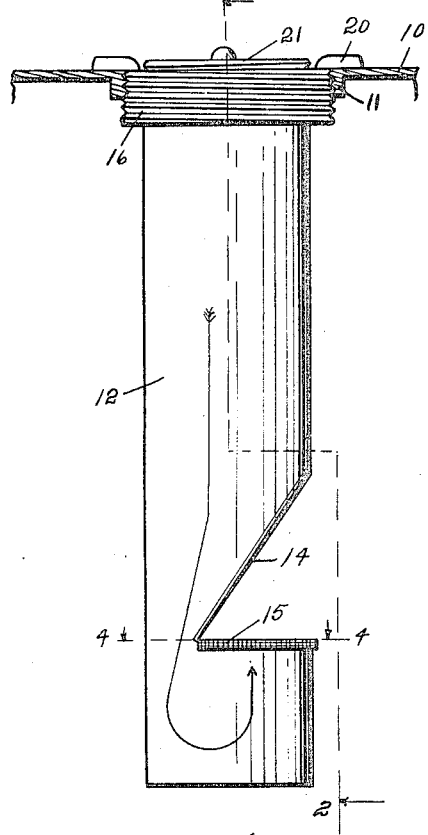
Figure 1 shows a side elevation of a strainer embodying my invention, installed in a gasolene tank.
Figure 2:
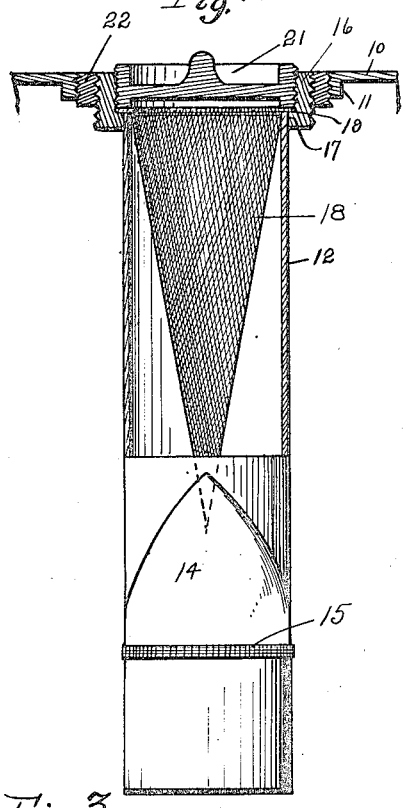
Fig. 2 shows a sectional view, taken on the line 2—2 of Fig. 1, and illustrating a slightly modified form of my invention.
Figure 4:
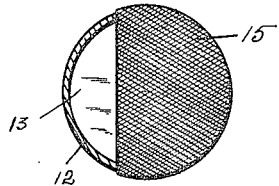
Fig. 4 shows a horizontal, sectional view, taken on the line 4—4 of Fig. 1.

In the drawings herewith illustrative of my invention, I have used the reference numeral 10 to indicate generally the wall of the gasolene tank having an opening, surrounding which is a flange 11 internally screw-threaded, as illustrated in Figs. 1 and 2.

My improved strainer comprises a cylindrical tubular member 12 closed at its lower end by a bottom 13 and open at its upper end.

Spaced above the lower end of the cylinder 12, the wall of said cylinder on one side thereof is inclined downwardly and inwardly at 14. Below the inclined wall portion 14 the open part of the cylinder is covered by a screen or the like 15 of the type now on the market for separating gasolene and water, which screen in itself forms no part of my present invention.

It will be seen that the construction of the strainer is such that gasolene poured into the top thereof takes substantially the course indicated by the arrow in Fig. 1, traveling downwardly to the bottom of the strainer and thence upwardly through the screen 15. The advantage of this construction will be hereinafter more fully mentioned.

For mounting the screen in the tank, I provide an annular ring or collar 16 which is externally screw-threaded, as shown in Figs. 1 and 2, and is also internally screw-threaded for the greater portion of its height from its upper edge. Near its lower edge the ring 16 is provided with an inwardly extending annular flange 17, the upper portion of which forms a shelf or shoulder. The upper end of the cylinder 12 is secured to the inner surface of the flange 17 in any suitable way.

Figure 3:
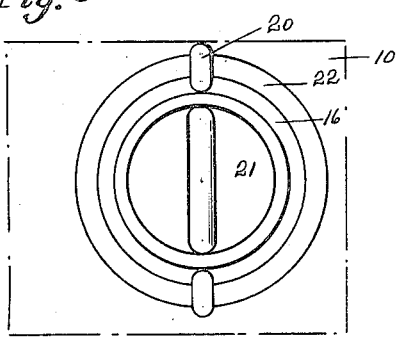
Fig. 3 shows a top or plan view of the device.

I mount in the upper portion of the cylinder 13 an upwardly opening cone-shaped strainer 18 shown in Fig. 2, having at its upper edge an outwardly extending flange 19 which rests upon the shoulder or shelf formed by the flange 17. The ring 16 is provided at its upper edge with a pair of opposite laterally extending lugs or the like 20, shown in Figs. 1 and 3, which may be grasped for manipulating the ring 16.

In the form of the device shown in Fig. 1 the ring 16 is screwed into the flange 11.

I provide a closure plug 21 adapted to be screwed into the ring 16 for closing the tank, and preferably so arranged that its lower edge engages and grips the flange 19 on the cone-shaped strainer 18.

The form of the device shown in Fig. 2 is similar to that shown in Fig. 1, with the exception that I provide outside the ring 16 an annular bushing 22 which may be of any desirable thickness, and when installed is internally and externally screw-threaded to fit the ring 16 and the flange 11. It will be seen that the strainer proper may be made in a standard size, and that special bushings 22 may be provided for fitting the strainer to tanks having openings of different sizes.

In the practical use of my improved strainer, the device is installed in the gasolene tank in the manner hereinbefore described.

When it is desired to fill the tank, the closure plug 21 is removed and gasolene is poured into the upper end of the strainer. The gasolene passes downwardly through the strainer 18, which separates any large foreign matter, such as dirt or the like, from the gasolene. The gasolene then passes downwardly into the lower portion of the strainer below the screen 15, and thereafter the weight of the incoming gasolene forces the gasolene from the lower portion of the strainer upwardly through the screen 15. It is well known that where there is water contained in gasolene, the water will go to the bottom and the gasolene will come to the top, so that the pure gasolene will pass through the screen 15, whereas water will be left in the bottom of the strainer cylinder 12. If the motion of the gasolene should drive any of the water against the screen 15, the screen 15 is of such material as to separate the water from the gasolene. Any solid matter which might pass through the strainer 18 will tend to settle in the bottom of the cylinder 12 and will not pass through the screen 15.

The advantages of arranging the screen 15 as shown, so that the gasolene is finally passed out of the strainer by an upward flowing movement, are largely obvious from the foregoing description of the construction and use of the device.

It may be mentioned, however, that the construction is such that the straining of the gasolene is obtained during the upward movement of gasolene, while at the same time permitting the strainer to be inserted through the ordinary opening in the tank. This desirable result is obtained by keeping the screen 15 within the general outline of the strainer.

It will be seen that if the screen 15 were put in the bottom of the cylinder 12, the weight of the incoming gasolene might force some water through the screen 15.

Another disadvantage which would occur if the screen 15 were placed at the bottom of the cylinder 12 and which is obviated by the construction shown, is the collection of dirt or the like on the screen 15, which would tend to retard the passage of gasolene into the tank and which might cause a small amount of fine dirt to pass through the screen 15.

It will be obvious that after the gasolene has been poured into the tank the entire strainer may be quickly and easily removed and inverted for pouring out any water that may have collected in the bottom thereof, and may be flushed for removing dirt.

Some changes may be made in the construction and arrangement of the parts of my improved device, without departing from the essential spirit and purpose of my invention, and it is my intention to cover by the patent to be issued hereon, any modified forms of structure or use of mechanical equivalents which may be reasonably included within the scope of my claims.

I claim as my invention:

1. An annular externally screw-threaded ring having an internal shoulder and internal screw-threads above said shoulder, a cylinder extending downwardly from said ring, an upwardly opening foraminous conical strainer received in said cylinder, and having a flange resting on said shoulder, a second strainer in the lower portion of said cylinder, laterally extending lugs on the upper part of said ring adapted to be grasped for rotating the ring, and also to limit the swinging movement of the ring when the ring is screwed into an opening, and a closure device adapted to be screwed into said ring and lock said flange against said shoulder.

2. An annular externally screw-threaded ring having an internal shoulder and internal screw-threads above said shoulder, a cylinder extending downwardly from said ring, an upwardly opening foraminous conical strainer received in said cylinder, and having a flange resting on said shoulder, a second strainer in the lower portion of said cylinder, laterally extending lugs on the upper part of said ring adapted to be grasped for rotating the ring, and also to limit the swinging movement of the ring when the ring is screwed into an opening, and a closure device adapted to be screwed into said ring and lock said flange against said shoulder, said closure device comprising an annular ring, a central web below the upper portion of said ring, and an upwardly projecting rib on said web adapted to be grasped.

Des Moines, Iowa, August 1, 1917.

JOHN A. BRADSHAW.